United States Patent
Rifkin et al.

(10) Patent No.: US 7,565,334 B2
(45) Date of Patent: Jul. 21, 2009

(54) FULLY BAYESIAN LINEAR REGRESSION

(75) Inventors: Ryan M Rifkin, Cambridge, MA (US); Ross A Lippert, Somerville, MA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/941,729

(22) Filed: Nov. 16, 2007

(65) Prior Publication Data

US 2008/0162386 A1 Jul. 3, 2008

Related U.S. Application Data

(60) Provisional application No. 60/866,399, filed on Nov. 17, 2006.

(51) Int. Cl.
*G06F 15/18* (2006.01)
(52) U.S. Cl. .......................... 706/12; 706/21
(58) Field of Classification Search .................. 706/12, 706/21
See application file for complete search history.

(56) References Cited

U.S. PATENT DOCUMENTS

| | | |
|---|---|---|
| 6,532,305 B1 | 3/2003 | Hammen |
| 6,687,887 B1 | 2/2004 | Teig et al. |
| 6,883,148 B1 | 4/2005 | Teig et al. |
| 2003/0161500 A1 | 8/2003 | Blake et al. |
| 2004/0078232 A1 | 4/2004 | Troiani |
| 2004/0239762 A1 | 12/2004 | Porikli et al. |
| 2005/0027514 A1 | 2/2005 | Zhang et al. |
| 2006/0184460 A1 | 8/2006 | Cleary |

OTHER PUBLICATIONS

Sofman et al., "Improving Robot Navigation Through Self-Supervised Online Learning", Robotics: Science and Systems II, University of Pennsylvania, Philadelphia, Pennsylvania, Aug. 16-19, 2006.*
Richard L. Burden et al., *Numerical Analysis* $7^{th}$ edition, 2001, pp. 241-247, Brooks/Cole-Thompson Learning, U.S.A.
J.N. Corcoran, *Bayesian Linear Regression—Single Variable*, Lecture Two of the APPM Bayesian Reading Group, Journal of the American Statistical Association, Dec. 1988, pp. 1023-1032, vol. 83, No. 404.
Andrew Gelman et al., *Bayesian Data Analysis* $2^{nd}$ *Edition*, 2004, pp. 1-668, CRC Press.

(Continued)

*Primary Examiner*—David R Vincent
*Assistant Examiner*—Nathan H Brown, Jr.
(74) *Attorney, Agent, or Firm*—Fenwick & West LLP; Mark Duell

(57) ABSTRACT

A simple yet powerful Bayesian model of linear regression is disclosed for methods and systems of machine learning. Unlike previous treatments that have either considered finding hyperparameters through maximum likelihood or have used a simple prior that makes the computation tractable but can lead to overfitting in high dimensions, the disclosed methods use a combination of linear algebra and numerical integration to work a full posterior over hyperparameters in a model with a prior that naturally avoids overfitting. The resulting algorithm is efficient enough to be practically useful. The approach can be viewed as a fully Bayesian version of the discriminative regularized least squares algorithm.

12 Claims, 9 Drawing Sheets

OTHER PUBLICATIONS

Zoubin Ghahramani, *Bayesian Machine Learning*, [online], 2 pages, Retrieved from the internet on May 13, 2007, Retrieved from the URL:<http://www.gatsby.ucl.ac.uk/~zoubin/bayesian.html>.

A.C. Genz et al, *Remarks on algorithm 006: An Adaptive algorithm for numerical integration over an N-dimensional rectangular region*, Journal of Computational and Applied Mathematics, Dec. 1980, vol. 6, No. 4.

Kevin Murphy, *CS540: Machine Learning I—Lecture 15: Linear Regression Cont'd*, Oct. 31, 2005, pp. 1-45 (with gaps).

Carl Edward Rasmussen et al., *Gaussian Processes for Machine Learning*, 2006, pp. 7-11, MIT Press.

*Regression analysis*, [online], Nov. 27, 2006, 6 pages, retrieved from the URL:<http://en.wikipedia.org/wiki/Regression_analysis>.

*Bayesian Linear Regression*, [online], Oct. 19, 2006, 3 pages, retrieved from the URL:<http://en.wikipedia.org/wiki/Bayesian_linear_regression>.

PCT International Search Report and Written Opinion, PCT US2007/24164, Jul. 25, 2008.

Schultz et al., "On-line Least-Squares Training For The Underdetermined Case," Neural Networks, 1999.

"CASRE," CASRE, 1998, 11 pages.

\* cited by examiner

FULLY BAYESIAN LINEAR REGRESSION

CROSS-REFERENCE TO RELATED APPLICATION(S)

This application claims priority under 35 U.S.C. § 119(e) to U.S. Provisional Patent Application No. 60/866,399 filed Nov. 17, 2006, which is hereby incorporated by reference in its entirety.

BACKGROUND OF THE INVENTION

1. Field of the Invention

This invention pertains in general to machine learning, and in particular to a Bayesian model of linear regression.

2. Description of the Related Art

Linear regression is a simple yet powerful approach to learning from data. The simplest algorithm for regression is ordinary least squares (OLS), which yields a hyperplane that minimizes the squared error between predictions and labels on a training set. In high dimensions with few examples, ordinary least squares can overfit badly, and needs to be regularized to produce sensible solutions. Additionally, it is often desirable to work in a Bayesian setting in order to produce confidence estimates and incorporate prior knowledge in our predictions.

In general, the Bayesian machine learning community frequently makes use of analytic Gaussian integrals, approximations such as using maximum likelihood to approximate a posterior with its maximum value, and Markov Chain Monte Carlo sampling, but does not make much use of modern tools for direct numerical low-dimensional integrations.

SUMMARY

Embodiments of the invention provide methods and systems of performing a Bayesian linear regression that includes regularization, where arbitrary priors are placed over both the scale of the linear function and the noise level. Through a combination of analytic Gaussian integration, singular value decomposition, and numerical integration over the hyperparameters, we can evaluate the posterior directly, without making approximations such as maximum likelihood or Monte Carlo sampling from the hyperparameters.

According to one aspect of the invention, the method starts with vague priors over the hyperparameters, and the data automatically cause the posterior to be well-concentrated around excellent regression results. In particular, the ratio of the noise and scale parameters act as a regularizer, and this ratio concentrates around values that a non-Bayesian regularized least-squares algorithm automatically selects via leave-one-out cross validation.

Another embodiment of the present invention provides a machine-readable medium (e.g., one or more compact disks, diskettes, servers, memory sticks, or hard drives) encoded with instructions, that when executed by one or more processors, cause the processor to carry out a process for Bayesian linear regression. This process can be, for example, similar to or a variation of the previously described method.

Another embodiment of the present invention provides a Bayesian linear regression system. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. In one particular case, the system is implemented in a computing environment such as a desktop or laptop computer, with an executable Bayesian Linear Regression module or set of modules stored therein.

Embodiments of the invention are particularly well-suited to machine learning situations with many variables relative to the number of examples. The resulting model is efficient enough to be practically useful, and it avoids overfitting in high dimensions.

The features and advantages described in this summary and the following detailed description are not all-inclusive. Many additional features and advantages will be apparent to one of ordinary skill in the art in view of the drawings, detailed description, and claims.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

In Section 1, a system overview is presented of the computing environment configured in accordance with an embodiment of the invention. In Section 2, a methodology is presented for the use of a Bayesian linear regression model. In Section 3, some mathematical preliminaries are briefly discussed. Section 4 introduces a model in accordance with one embodiment of the invention. Section 5 discusses the analytic derivations, and provides the pieces of the model that can be evaluated analytically. Section 6 demonstrates how to evaluate the remaining parts computationally. Section 7 compares the described model to related work in the field. Section 8 describes a computational experiment illustrating the properties of the model and method in accordance with one embodiment.

1. System Overview

Figure 1:
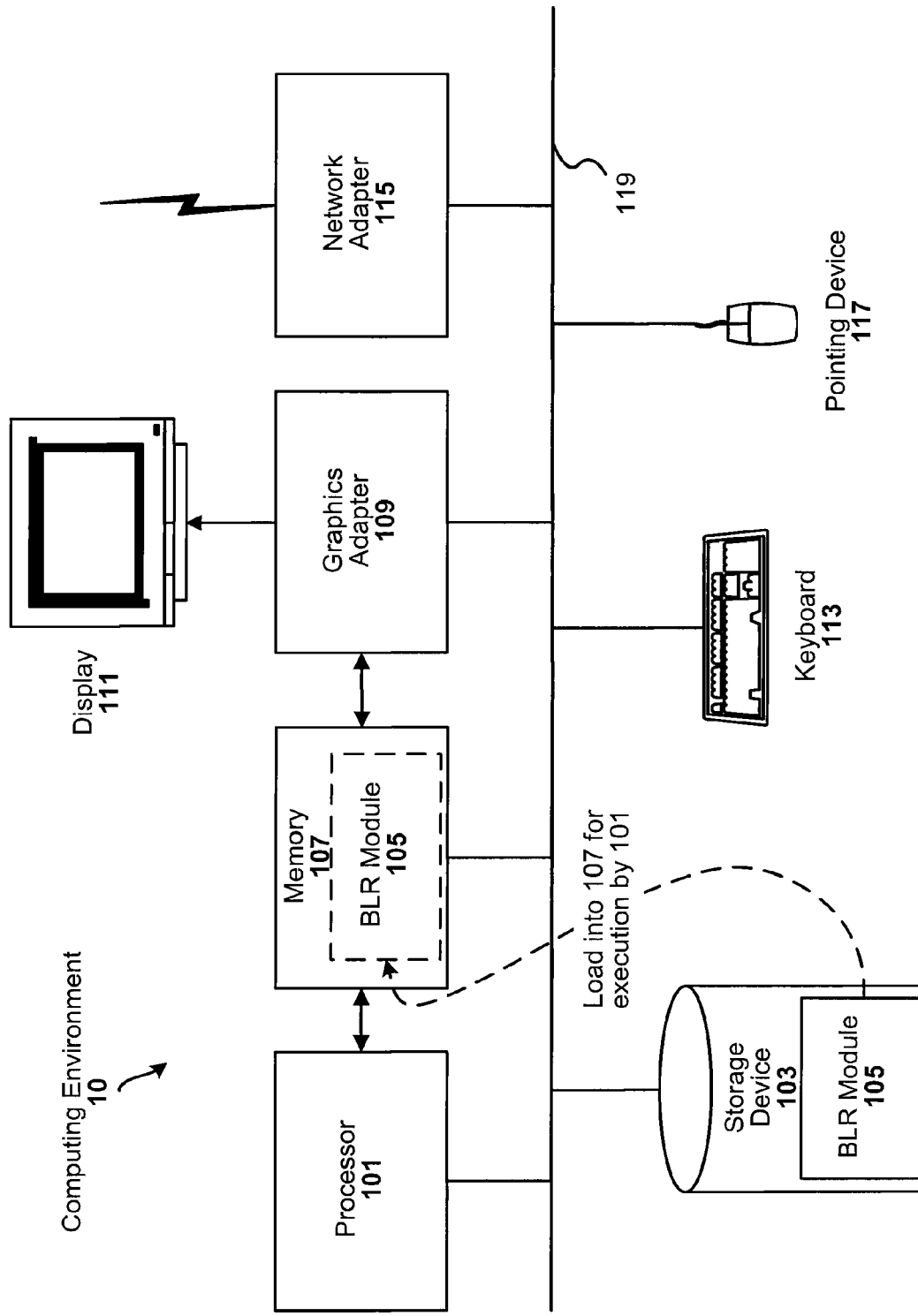
FIG. 1 is a block diagram illustrating a computing environment configured in accordance with an embodiment of the present invention.

FIG. 1 is a block diagram illustrating a computing environment 10 configured in accordance with an embodiment of the present invention.

As can be seen with this example, the computing environment 10 includes a processor 101 operatively coupled via a bus 119 to a memory 107, a storage device 103 for storing an Bayesian Linear Regression (BLR) module 105 (and other executable code, such as an operating system and applications), a keyboard 113, a graphics adapter 109, a pointing device 117, and a network adapter 115. A display 111 is operatively coupled to the graphics adapter 109.

The processor 101 may be any processor or set of processors capable of executing various operating systems (e.g., UNIX) and applications/drivers (e.g., MATLAB) of the computing environment 10. Numerous suitable processors can be used, as will be apparent in light of this disclosure. The memory 107 may be, for example, firmware ROM, RAM, and/or flash memory, and holds instructions and data used by the processor 101. The storage device 103 is a hard disk drive in one embodiment, but can also be any other device capable of persistently storing data, such as a memory stick and/or a solid-state memory device. The storage device 103 can hold multiple files containing executable code and/or data, as is typically done. The computing environment 10 operates to load an executable file into memory 107 and execute it using the processor 101. In the embodiment shown, the Bayesian Linear Regression module 105 is stored in storage device 103 as executable code, and is loaded into memory 107 for execution by the processor 101 as one or more processes.

The files stored on the storage device 103 can be, for example, in the MATLAB format (sometimes referred to as M-files). Other file formats may also be stored on storage device 103 in any file types necessary for the computing environment to properly operate. Such files are typical of computing environments that employ Microsoft operating systems. Other file formats, such as those utilized by Apple Macintosh and UNIX based computers will be apparent in light of this disclosure.

The pointing device 117 may be a mouse, track ball, or other such user input device, and is used in combination with the keyboard 113 to allow the user to interact with the computing environment 10 (e.g. input data and respond to prompts), as is typically done. The graphics adapter 109 displays images and other information on the display 111. The network adapter 115 communicatively couples the computing environment 10 with an external network such as the Internet or LAN, or combination thereof (e.g., via conventional wired or wireless technology), if so desired and as is typically done.

The computing environment 10 is adapted to execute computer program modules for performing Bayesian linear regression, including the BLR module 105. Structure and functionality of the BLR module 105 will be discussed in further detail with reference to FIGS. 2 through 5H. As will be apparent in light of this disclosure, the computing environment 10 can be implemented via processing systems such as a general purpose desktop or laptop computer, or a special-purpose processing system configured to carryout the Bayesian linear regression as described herein. Other computationally intensive processes can be limited as needed to reserve processing power for Bayesian linear regression processing as discussed herein, although a standard user desktop environment can also be running.

2. Methodology

Figure 2:
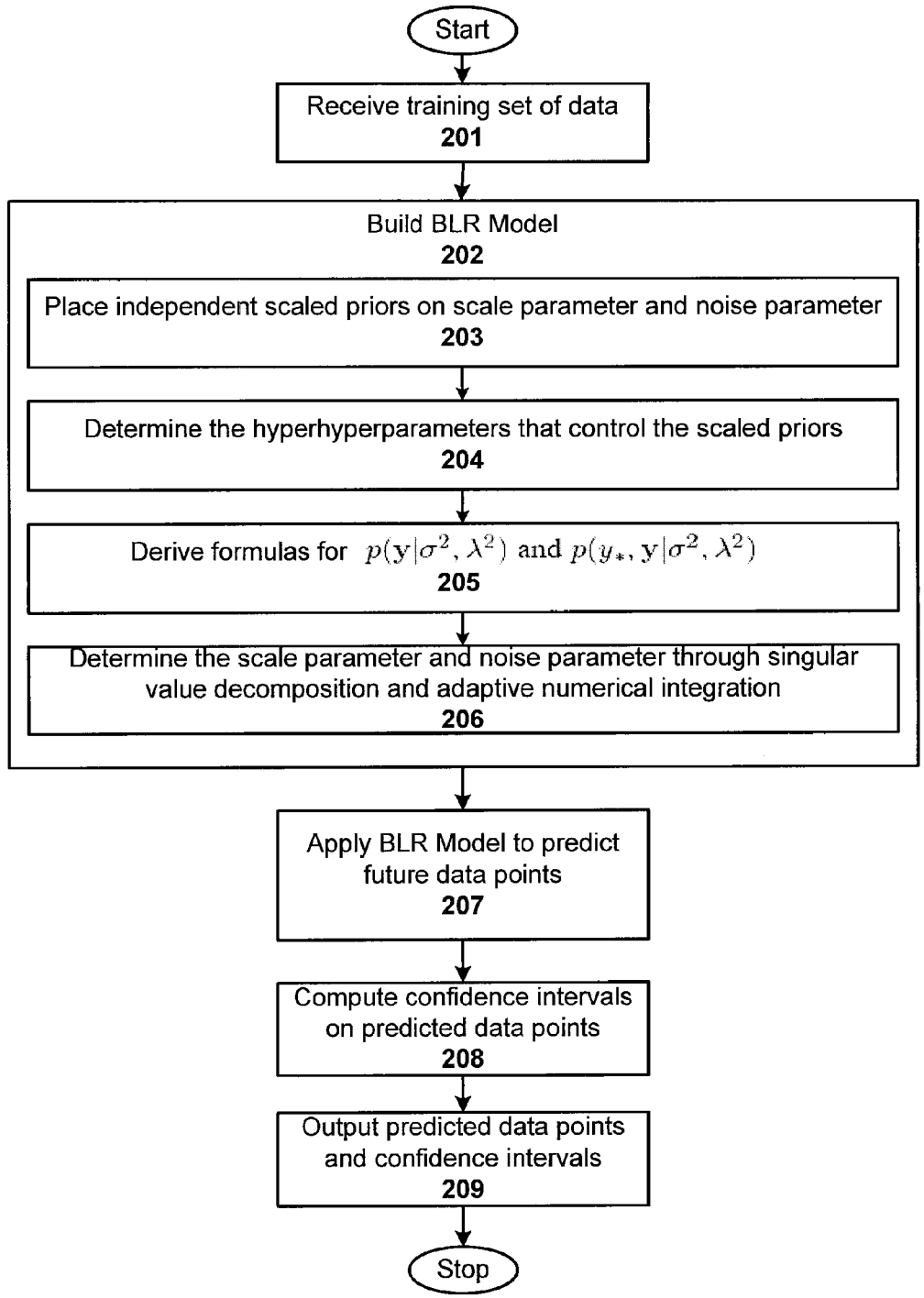
FIG. 2 is a flowchart illustrating a method of predicting data points and confidence intervals in accordance with an embodiment of the present invention.

In the following sections, the derivation of the Bayesian linear regression model used within the BLR module 105 will be described. FIG. 2 is a flowchart illustrating a method of predicting data points and confidence intervals in accordance with an embodiment of the present invention.

According to one embodiment, the method begins with receiving a training set of data 201 within the BLR module 105. This data is used to train a BLR model for use in a given application. Applications include but are not limited to face recognition, handwriting recognition, voice recognition, speech recognition, pose recognition, motion detection, gesture recognition, and image recognition, and other machine learning tasks. For example, in the application of handwriting recognition, the training set of data may include a variety of samples of handwritten letters and numbers. In some cases, there may be few training data points, but in other cases, there may be many training data points. The training points may be low dimensional or high dimensional, depending on the application.

In step 202, the BLR model is built 202. The formation as well as the function and benefits of the BLR model are described in greater detail below in the following sections. Generally, independent scaled priors are placed on a scale parameter and a noise parameter 203. The hyperhyperparamters that control the scaled priors on the scale parameter and noise parameter are determined 204. Formulas are derived for $p(y|\sigma^2, \lambda^2)$ and $p(y_*, y|\sigma^2, \lambda^2)$ in step 205. In step 206, the scale parameter and noise parameter are determined through singular value decomposition and adaptive numerical integration, as described in detail in section 6.

After the BLR module 105 has been trained, the BLR module applies the BLR model to predict future data points 207. In step 208, the confidence intervals on the predicted data points are computed. Because the BLR model is fully Bayesian, the confidence intervals on the outputs can be obtained in a principled way, without the errors introduced by other methods.

Then, the predicted data points and confidence intervals can be output 209. For example, the predicted data points and confidence intervals can be output to display 111 for a user to view, or the predicted data points and confidence intervals can be output to a storage device 103, or to another storage device coupled to the computing environment 10, such as through network adapter 115.

3. Mathematical Preliminaries

In this section, some mathematical preliminaries will be described. We are given n labeled training points in d dimensions. The data matrix X is n by d; its ith row is $x_i$ (a row vector). The training labels are given by y (an n-dimensional column vector). We frequently discuss making a new "test" point $(x_*, y_*)$. We treat X as fixed and do not place a generative model over it, and we omit X (and $x_*$) from conditioning formulas. We will frequently refer (when discussing computational complexity) to $\bar{k}=\min\{n, d\}$ and $\bar{K}=\max\{n,d\}$.

We review the following well-known Gaussian integrals. For a one-dimensional y, $$\int_l^h \exp\left(-\frac{1}{2}(ay^2 + 2by)\right)dy = \int_l^h \exp\left(-\frac{1}{2}(a(y+a^{-1}b)^2 - a^{-1}b^2)\right)dy$$

$$= \exp\left(\frac{b^2}{2a}\right)\int_l^h \exp\left(-\frac{1}{2}a(y+a^{-1}b)^2\right)dy$$

$$= \exp\left(\frac{b^2}{2a}\right)\sqrt{\frac{2}{a}} \int_{\sqrt{\frac{a}{2}}(l+a^{-1}b)}^{\sqrt{\frac{a}{2}}(h+a^{-1}b)} \exp(-u^2)du$$

$$= \exp\left(\frac{b^2}{2a}\right)\sqrt{\frac{2\pi}{a}}\left(\frac{1}{2}\mathrm{erf}\left(\sqrt{\frac{a}{2}}(h+a^{-1}b)\right) - \frac{1}{2}\mathrm{erf}\left(\sqrt{\frac{a}{2}}(l+a^{-1}b)\right)\right)$$

$$= \sqrt{\frac{2\pi}{a}}\exp\left(\frac{b^2}{2a}\right)\frac{1}{2}\mathrm{erf}\left(\sqrt{\frac{a}{2}}(u+a^{-1}b)\right)\bigg|_{u=l}^{u=h}$$

For a d-dimensional w, $$\int_{\mathbb{R}^d} \exp\left(-\frac{1}{2}(w^t A w + 2 b^t w)\right)dw = \int_{\mathbb{R}^d} \exp\left(-\frac{1}{2}(\|w + A^{-1}b\|_A^2 - b^t A^{-1}b)\right)$$

$$= (2\pi)^{\frac{d}{2}}|A|^{-\frac{1}{2}}\exp\left(\frac{1}{2}b^t A^{-1}b\right).$$

4. Bayesian Linear Regression Model

In this section, we describe the formation of a Bayesian linear regression model that can reside in the BLR module 105, and can be used, for example, to predict data points and associated confidence intervals according to the method of FIG. 2. We consider a linear regression model for data points $x_i \in \mathbb{R}^{1 \times d}$ with labels $y_i \in \mathbb{R}$. We hypothesize a hyperplane $w \in \mathbb{R}^{d \times 1}$ with an isotropic Gaussian prior:

$$p(w|\lambda^2) = (2\pi\lambda^2)^{-d/2}\exp\left(-\frac{\|w\|^2}{2\lambda^2}\right)$$

Additionally, there is Gaussian noise in the output value $(y_i = x_i w + N(0, \sigma^2))$:

$$p(y_i|w, \sigma^2) = (2\pi\sigma^2)^{-\frac{1}{2}}\exp\left(-\frac{(y_i - x_i w)^2}{2\sigma^2}\right)$$

$$p(y|w, \sigma^2) = \prod_{i=1}^n p(y_i|w, \sigma^2)$$

$$= (2\pi\sigma^2)^{-n/2}\exp\left(-\frac{\|y - Xw\|^2}{2\sigma^2}\right).$$

So far, this approach is similar to the treatment present in Rasmussen and Williams. *Gaussian Processes for Machine Learning*. MIT Press, 2006, (Section 2.1.1). When the hyperparameters are known constants, the posterior distribution of w is Gaussian. In our approach, we place independent scaled inverse—$\chi^2$ priors on the scale parameter $\lambda^2$ and noise parameter $\sigma^2$:

$$p(\lambda^2) = \frac{(v_\lambda/2)^{v_\lambda/2}}{\Gamma(v_\lambda/2)}\lambda_0^{v_\lambda}(\lambda^2)^{-(v_\lambda/2+1)}\exp\left(-\frac{v_\lambda \lambda_0^2}{2\lambda^2}\right)$$

$$p(\sigma^2) = \frac{(v_\sigma/2)^{v_\sigma/2}}{\Gamma(v_\sigma/2)}\sigma_0^{v_\sigma}(\sigma^2)^{-(v_\sigma/2+1)}\exp\left(-\frac{v_\sigma \sigma_0^2}{2\sigma^2}\right)$$

$$p(\sigma^2, \lambda^2) = p(\sigma^2)p(\lambda^2).$$

The joint probability is $p(y, w, \sigma^2, \lambda^2) = p(y|w, \sigma^2)p(w|\lambda^2)p(\sigma^2)p(\lambda^2)$. When we want to make a prediction at a new data point $x_*$, the joint becomes $$p(y_*, y, w, \sigma^2, \lambda^2) = p(y_*|w, \sigma^2)p(y|w, \sigma^2)p(w|\lambda^2)p(\sigma^2)p(\lambda^2)$$

We are interested in the posterior distribution of the scale parameters and the posterior distribution of the output at a new test point $x_*$:

$$p(\sigma^2, \lambda^2|y) = \frac{p(\sigma^2, \lambda^2, y)}{p(y)}$$

$$= \frac{1}{p(y)}\int p(y, w, \sigma^2, \lambda^2)dw$$

$$= \frac{p(\sigma^2, \lambda^2)}{p(y)}\int p(y|w, \sigma^2)p(w|\lambda^2)dw$$

$$p(y_*|y) = \frac{1}{p(y)}\int \left(\int p(y_*, y, w, \sigma^2, \lambda^2)dw\right)d\sigma^2 d\lambda^2$$

$$= \frac{1}{p(y)}\int p(\sigma^2, \lambda^2)\left(\int p(y_*|w, \sigma^2)p(y|w, \sigma^2)\right.$$
$$\left. p(w|\lambda^2)dw\right)d\sigma^2 d\lambda^2,$$

where the parentheses indicate the order of integration for tractability (integrals whose limits are not given go from $-\infty$ to $\infty$ in the dimensions of w and from 0 to $\infty$ for $\sigma^2$ and $\lambda^2$). The normalizer in both cases is:

$$p(y) = \int p(y, w, \sigma^2, \lambda^2)dw d\sigma^2 d\lambda^2$$

$$= \int \left(\int p(y, w, \sigma^2, \lambda^2)dw\right)d\sigma^2 d\lambda^2$$

$$= \int p(\sigma^2, \lambda^2)\left(\int p(y|w, \sigma^2)p(w|\lambda^2)dw\right)d\sigma^2 d\lambda^2.$$

The scaled inverse—$\chi^2$ priors on $\sigma^2$ and $\lambda^2$ are controlled by hyperhyperparameters $v_\sigma$, $\sigma_0^2$, $v_{80}$, and $\lambda_0^2$. The prior for $\sigma_0^2$ has mean and variance as given by Gelman, Carlin, Stern, and Rubin, *Bayesian Data Analysis*, Chapman & Hall/CRC, second edition, 2004:

$$E(\sigma^2) = \frac{v_\sigma}{v_\sigma - 2}\sigma_0^2$$

$$\mathrm{var}(\sigma^2) = \frac{2v_\sigma^2}{(v_\sigma - 2)^2(v_\sigma - 4)}\sigma_0^4.$$

Rather than work with $v_\sigma$ and $\sigma_0^2$ directly, we invert these formulas to specify our hyperhyperparameters in terms of the desired mean and variance:

$$v_\sigma = 2\left(\frac{E(\sigma^2)^2}{\text{var}(\sigma^2)} + 2\right)$$

$$\sigma_0^2 = 2E(\sigma^2)\frac{v_\sigma/2 - 1}{v_\sigma}$$

A precisely analogous situation holds for $\lambda^2$. We set $E(\sigma^2) = \text{var}(y)$ and $E(\lambda^2)$ to be the average variance (across the dimensions) of X, and set the variances to be c times the respective means, for some c. In our experiments, c=100, although the results are highly insensitive to the choice of c. The idea is to set the hyperhyperparameters' expected values to a very rough guess, and keep the variance large enough that we are not relying on the guess being accurate. The data will substantially sharpen the distributions of $\sigma^2$ and $\lambda^2$. Because we integrate numerically over $\sigma^2$ and $\lambda^2$, the precise functional form of their priors is not critical, and straightforward modifications to the techniques discussed here allow the incorporation of arbitrary prior knowledge about $\sigma^2$ and $\lambda^2$.

5. Analytic Derivations

In the following description, we derive formulas for $p(y|\sigma^2, \lambda^2)$ and $p(y_*, y|\sigma^2, \lambda^2)$ by marginalizing over w, a Gaussian integration. The posterior distribution and expectation of $y_*$ are related to these quantities by $$p(l < y_* < h | y) = \frac{p(l < y_* < h, y)}{p(y)}$$

$$= \frac{\int p(\sigma^2, \lambda^2)\left(\int_l^h p(y_*, y | \sigma^2, \lambda^2) dy_*\right) d\sigma^2 d\lambda^2}{\int p(\sigma^2, \lambda^2) p(y | \sigma^2, \lambda^2) d\sigma^2 d\lambda^2}$$

$$E(y_* | y) = \frac{\int p(\sigma^2, \lambda^2)\left(\int y_* p(y_*, y | \sigma^2, \lambda^2) dy_*\right) d\sigma^2 d\lambda^2}{\int p(\sigma^2, \lambda^2) p(y | \sigma^2, \lambda^2) d\sigma^2 d\lambda^2}$$

The integration over w is a Gaussian integral, analytically tractable, $$p(y | \sigma^2, \lambda^2) = \int p(y | w, \sigma^2) p(w | \lambda^2) dw$$

$$= \int (2\pi\lambda^2)^{-d/2} (2\pi\sigma^2)^{-n/2} \exp\left(-\frac{\|y - Xw\|^2}{2\sigma^2} - \frac{\|w\|^2}{2\lambda^2}\right) dw$$

$$= \int (2\pi\lambda^2)^{-d/2} (2\pi\sigma^2)^{-n/2} \exp\left(-\frac{1}{2\sigma^2}\left(y^t y - 2y^t Xw + w^t\left(X^t X + \frac{\sigma^2}{\lambda^2} I\right)w\right)\right) dw$$

$$= (2\pi\lambda^2)^{-d/2}(2\pi\sigma^2)^{-(n-d)/2}\left|X^t X + \frac{\sigma^2}{\lambda^2}I\right|^{-\frac{1}{2}} \times$$

$$\exp\left(-\frac{1}{2\sigma^2}\left(y^t y - y^t X\left(X^t X + \frac{\sigma^2}{\lambda^2}I\right)^{-1} X^t y\right)\right)$$

$$= (2\pi\lambda^2)^{-d/2}(2\pi\sigma^2)^{-(n-d)/2}|G_{\sigma,\lambda}|^{-\frac{1}{2}}$$

$$\exp\left(-\frac{1}{2\sigma^2}(y^t y - y^t X G_{\sigma,\lambda}^{-1} X^t y)\right),$$

where $G_{\sigma,\lambda} \equiv X^t X + \frac{\sigma^2}{\lambda^2} I$. Similarly, for $p(y_*, y | \sigma^2, \lambda^2)$, -continued $$p(y_*, y | \sigma^2, \lambda^2) = \int_{\mathbb{R}^d} p(y_* | w, \sigma^2) p(y | w, \sigma^2) p(w | \lambda^2) dw$$

$$= \int (2\pi\lambda^2)^{-d/2}(2\pi\sigma^2)^{-(n+1)/2} \times \exp\left(-\frac{(y_* - x_* w)^2}{2\sigma^2}\right)$$

$$\exp\left(-\frac{\sum_i (y_i - x_i w)^2}{2\sigma^2}\right) \exp\left(-\frac{\|w\|^2}{2\lambda^2}\right) dw$$

$$= \int (2\pi\lambda^2)^{-d/2}(2\pi\sigma^2)^{-(n+1)/2} \times$$

$$\exp\left(-\frac{1}{2\sigma^2}\left(y_*^2 + y^t y - 2(y_* x_* + y^t X)w + w^t\left(x_*^t x_* + X^t X + \frac{\sigma^2}{\lambda^2}I\right)w\right)\right) dw$$

$$= (2\pi\lambda^2)^{-d/2}(2\pi\sigma^2)^{-(n-d+1)/2} |Z_{\sigma,\lambda}|^{-\frac{1}{2}} \times$$

$$\exp\left(-\frac{1}{2\sigma^2}(y_*^2 + y^t y - (y_* x_* + y^t X) Z_{\sigma,\lambda}^{-1}(x_*^t y_* + X^t y))\right).$$

where $Z_{\sigma,\lambda} \equiv x_*^t x_* + G_{\sigma,\lambda}$. Since $x_*^t x_*$ is a rank $-1$ matrix, the following "update formulas" apply, $$|Z_{\sigma,\lambda}| = |x_*^t x_* + G_{\sigma,\lambda}| = (1 + x_* G_{\sigma,\lambda}^{-1} x_*^t)|G_{\sigma,\lambda}|$$

$$Z_{\sigma,\lambda}^{-1} = (x_*^t x_* + G_{\sigma,\lambda})^{-1} = G_{\sigma,\lambda}^{-1} - \frac{G_{\sigma,\lambda}^{-1} x_*^t x_* G_{\sigma,\lambda}^{-1}}{1 + x_* G_{\sigma,\lambda}^{-1} x_*^t}$$

and thus $$Z_{\sigma,\lambda}^{-1} x_*^t = G_{\sigma,\lambda}^{-1} x_*^t - \frac{G_{\sigma,\lambda}^{-1} x_*^t x_* G_{\sigma,\lambda}^{-1} x_*^t}{1 + x_* G_{\sigma,\lambda}^{-1} x_*^t}$$

$$= G_{\sigma,\lambda}^{-1} x_*^t \left(\frac{1}{1 + x_* G_{\sigma,\lambda}^{-1} x_*^t}\right)$$

$$1 - x_* Z_{\sigma,\lambda}^{-1} x_*^t = 1 - \frac{x_* G_{\sigma,\lambda}^{-1} x_*^t}{1 + x_* G_{\sigma,\lambda}^{-1} x_*^t}$$

$$= \frac{1}{1 + x_* G_{\sigma,\lambda}^{-1} x_*^t}$$

$$y^t X Z_{\sigma,\lambda}^{-1} x_*^t = \frac{y^t X G_{\sigma,\lambda}^{-1} x_*^t}{1 + x_* G_{\sigma,\lambda}^{-1} x_*^t}.$$

Hence $$y_*^2 - (y_* x_*^t + y^t X) Z_{\sigma,\lambda}^{-1}(y_* x_* + X^t y) = (-y^t X Z_{\sigma,\lambda}^{-1} X^t y) +$$

$$((1 - x_* Z_{\sigma,\lambda}^{-1} x_*^t) y_*^2 - 2 y_* x_* Z_{\sigma,\lambda}^{-1} X^t y)$$

$$= \left(-y^t X G_{\sigma,\lambda}^{-1} X^t y + \frac{y^t X G_{\sigma,\lambda}^{-1} x_*^t x_* G_{\sigma,\lambda}^{-1} X^t y}{1 + x_* G_{\sigma,\lambda}^{-1} x_*^t}\right) +$$

$$\left(\frac{y_*^2 - 2 y_* x_* G_{\sigma,\lambda}^{-1} X^t y}{1 + x_* G_{\sigma,\lambda}^{-1} x_*^t}\right)$$

$$= -y^t X G_{\sigma,\lambda}^{-1} X^t y - \frac{(y_* - x_* G_{\sigma,\lambda}^{-1} X^t y)^2}{1 + x_* G_{\sigma,\lambda}^{-1} x_*^t},$$

which simplifies $p(y_*, y | \sigma^2, \lambda^2)$

-continued $$p(y_*, y \mid \sigma^2, \lambda^2) = (2\pi\lambda^2)^{-d/2}(2\pi\sigma^2)^{-(n-d+1)/2}|Z_{\sigma,\lambda}|^{-\frac{1}{2}} \times$$
$$\exp\left(-\frac{1}{2\sigma^2}(y^t y - y^t X G_{\sigma,\lambda}^{-1} X^t y)\right) \times$$
$$\exp\left(-\frac{1}{2\sigma^2}\frac{(y_* - x_* G_{\sigma,\lambda}^{-1} X^t y)^2}{1 + x_* G_{\sigma,\lambda}^{-1} x_*^t}\right)$$
$$= (2\pi\lambda^2)^{-d/2}(2\pi\sigma^2)^{-(n-d)/2}|G_{\sigma,\lambda}|^{-\frac{1}{2}} \times$$
$$\exp\left(-\frac{1}{2\sigma^2}(y^t y - y^t X G_{\sigma,\lambda}^{-1} X^t y)\right) \times$$
$$(2\pi\sigma^2(1 + x_* G_{\sigma,\lambda}^{-1} x_*^t))^{-\frac{1}{2}} \exp\left(\frac{(y_* - x_* G_{\sigma,\lambda}^{-1} X^t y)^2}{2\sigma^2(1 + x_* G_{\sigma,\lambda}^{-1} x_*^t)}\right).$$

Therefore, $$\int_l^h p(y_*, y \mid \sigma^2, \lambda^2) dy_* = (2\pi\lambda^2)^{-d/2}(2\pi\sigma^2)^{-(n-d)/2}|G_{\sigma,\lambda}|^{-\frac{1}{2}} \times$$
$$\exp\left(-\frac{1}{2\sigma^2}(y^t y - y^t X G_{\sigma,\lambda}^{-1} X^t y)\right)\frac{1}{2}\mathrm{erf}\left(\frac{u - m_{\sigma,\lambda}}{\sqrt{2v_{\sigma,\lambda}}}\right)\bigg|_{u=l}^{u=h}$$

where $m_{\sigma,\lambda} \equiv x_* G_{\sigma,\lambda}^{-1} X^t y$ and $v_{\sigma,\lambda} \equiv \sigma^2(1 + x_* G_{\sigma,\lambda}^{-1} x_*^t)$, and $\int_R y_* p(y_*, y \mid \sigma^2, \lambda^2) dy_* = (2\pi\lambda^2)^{-d/2}(2\pi\sigma^2)^{-(n-d)/2}$ $$|G_{\sigma,\lambda}|^{-\frac{1}{2}} \times \exp\left(-\frac{1}{2\sigma^2}(y^t y - y^t X G_{\sigma,\lambda}^{-1} X^t y)\right)(x_* G_{\sigma,\lambda}^{-1} X^t y).$$

6. Computational Methods

We want to compute:

$$p(y) = \int p(\sigma^2, \lambda^2)\left(\int p(y \mid w, \sigma^2) p(w \mid \lambda^2) dw\right) d\sigma^2 d\lambda^2$$

$$p(l \le y_* \le h \mid y) =$$
$$\frac{1}{p(y)} \int p(\sigma^2, \lambda^2)\left(\int_l^h \left(\int p(y_*, y \mid w, \sigma^2) p(w \mid \lambda^2) dw\right) dy_*\right) d\sigma^2 d\lambda^2$$

$$E(y_* \mid y) =$$
$$\frac{1}{p(y)} \int p(\sigma^2, \lambda^2)\left(\int y_*\left(\int p(y_*, y \mid w, \sigma^2) p(w \mid \lambda^2) dw\right) dy_*\right) d\sigma^2 d\lambda^2.$$

We have explicit formulas from the previous section for the integrals over w and $y_*$. These formulas are in terms of y, X, and $x_*$, which are fixed, and $G_{\sigma,\lambda}$ and $G_{\sigma,\lambda}^{-1}$ which vary with $\sigma^2, \lambda^2$.

The efficient computation of the $\sigma^2, \lambda^2$ integrals rests on two pillars: the singular value decomposition and adaptive numerical integration. The first makes the computation of the integrand cheap, while the second computes the integrals themselves from multiple evaluations of the integrand.

6.1 Singular Value Decomposition

We can form the singular value decomposition, $USV^t = X$ where $U \in \mathbb{R}^{n \times k}$, $S \in \mathbb{R}^{k \times k}$, $V \in \mathbb{R}^{d \times k}$ in O(ndk) time. As presented here, our discussion and implementation simultaneously addresses the d<n and d>n cases. If only one of these cases is desired, a somewhat simpler formula can be used, as would be apparent to one of ordinary skill in the art.

$$G_{\sigma,\lambda} = X^t X + \frac{\sigma^2}{\lambda^2} I_d$$
$$= V\left(S^2 + \frac{\sigma^2}{\lambda^2} I_k\right)V^t + \frac{\sigma^2}{\lambda^2}(I_d - VV^t)$$

$$G_{\sigma,\lambda}^{-1} = V\left(S^2 + \frac{\sigma^2}{\lambda^2} I_k\right)^{-1} V^t + \frac{\lambda^2}{\sigma^2}(I_d - VV^t)$$

$$|G_{\sigma,\lambda}| = \left|S^2 + \frac{\sigma^2}{\lambda^2} I_k\right|\left(\frac{\sigma^2}{\lambda^2}\right)^{d-k}$$

The second term of $G_{\sigma,\lambda}$ vanishes when d=k, since $VV^t = I_d$ in this case. This allows various numerical quantities related to $G_{\sigma,\lambda}$ to be computed rapidly. With U, S, V pre-computed, $|G_{\sigma,\lambda}|$ O(k) time. With $U^t y \in \mathbb{R}^{k \times 1}$ and $x_* V \in \mathbb{R}^{1 \times k}$ pre-computed, $$y^t X G_{\sigma,\lambda}^{-1} X^t y = (U^t y)^t S^2 \left(S^2 + \frac{\sigma^2}{\lambda^2}\right)^{-1}(U^t y)$$

$$x_* G_{\sigma,\lambda}^{-1} X^t y = (x_* V) S^2 \left(S^2 + \frac{\sigma^2}{\lambda^2}\right)^{-1}(U^t y)$$

$$x_* G_{\sigma,\lambda}^{-1} x_*^t = (x_* V)\left(S^2 + \frac{\sigma^2}{\lambda^2}\right)^{-1}(x_* V)^t$$

are also O(k) time.

Via the singular value decomposition, we reduce the computation to two-dimensional integrals of functions of $\sigma^2$ and $\lambda^2$ which we can evaluate in O(k) time. To find the normalizing constant, p(y), we need to evaluate the integral $$p(y) = C \int (\sigma^2)^{-\frac{v_\sigma + n - k}{2} - 1}(\lambda^2)^{-\frac{v_\lambda + k}{2} - 1}\left|S^2 + \frac{\sigma^2}{\lambda^2}\right|^{-\frac{1}{2}} \times$$
$$\exp\left(-\frac{v_\lambda \lambda_0^2}{2\lambda^2} - \frac{1}{2\sigma^2}\left(v_\sigma \sigma_0^2 + \|y\|^2 - (U^t y)^t S^2 \left(S^2 + \frac{\sigma^2}{\lambda^2}\right)^{-1}(U^t y)\right)\right)$$
$$d\sigma^2 d\lambda^2.$$

where both $\sigma^2$ and $\lambda^2$ go from zero to infinity. Similarly, to find $p(l \le y_* \le h \mid y)$, we need to evaluate $$p(l \le y_* \le h \mid y) = \frac{C}{p(y)} \int (\sigma^2)^{-\frac{v_\sigma + n - k}{2} - 1}(\lambda^2)^{-\frac{v_\lambda + k}{2} - 1}\left|S^2 + \frac{\sigma^2}{\lambda^2}\right|^{-\frac{1}{2}} \times$$
$$\exp\left(-\frac{v_\lambda \lambda_0^2}{2\lambda^2} - \frac{1}{2\sigma^2}\left(v_\sigma \sigma_0^2 + \|y\|^2 - (U^t y)^t S^2 \left(S^2 + \frac{\sigma^2}{\lambda^2}\right)^{-1}(U^t y)\right)\right) \times$$
$$\frac{1}{2}\mathrm{erf}\left(\frac{u - m_{\sigma,\lambda}}{\sqrt{2v_{\sigma,\lambda}}}\right)\bigg|_{u=l}^{u=h} d\sigma^2 d\lambda^2$$

where $$m_{\sigma,\lambda} = (x_* V) S\left(S^2 + \frac{\sigma^2}{\lambda^2}\right)^{-1}(U^t y)$$

$$v_{\sigma,\lambda} = \sigma^2\left(1 + (x_* V)\left(S^2 + \frac{\sigma^2}{\lambda^2}\right)^{-1}(x_* V)^t\right) + \lambda^2(\|x_*\|^2 - \|x_* V\|^2).$$

In all our integrals, both the numerator and the denominator contain a factor of $$C \equiv (2\pi)^{-n/2} \frac{(v_\lambda/2)^{v_\lambda/2}}{\Gamma(v_\lambda/2)} \lambda_0^{v_\lambda} \frac{(v_\sigma/2)^{v_\sigma/2}}{\Gamma(v_\sigma/2)} \sigma_0^{v_\sigma},$$

which cancels for all quantities of interest.

6.2 Integration

The techniques employed for our two-dimensional integrals are fairly standard to numerical analysts, though possibly unfamiliar to the machine learning community. Our integrals are of the form $$\int_0^\infty \int_0^\infty f(\alpha, \beta) \alpha^{-e_\alpha - 1} \beta^{-e_\beta - 1}$$

$$\prod_{i=1}^k \left(s_i^2 + \frac{\alpha}{\beta}\right)^{-\frac{1}{2}} \exp\left(a - \frac{b}{2\alpha} - \frac{c}{2\beta} + \frac{1}{2\alpha} \sum_{i=1}^k \frac{v_i^2}{s_i^2 + \frac{\alpha}{\beta}}\right) d\alpha \, d\beta$$

where $e_\alpha$, $e_\beta$, $s_b^2$, $v_i$, $a$, $b$, $c$ are constants and $f(\alpha, \beta)$ is some function of $\alpha = \sigma^2$, $\beta = \lambda^2$ and auxiliary parameters specified by the application:

for $p(y)$ one takes $f = 1$.

for $p(l < y_* < h | y)$ one takes $$f(\sigma^2, \lambda^2) = \frac{1}{2p(y)} \mathrm{erf}\left(\frac{u - m_{\sigma,\lambda}}{\sqrt{2v_{\sigma,\lambda}}}\right)\Big|_{u=l}^{u=h}.$$

for $E(y_* | y)$ one takes $$f(\sigma^2, \lambda^2) = \frac{1}{p(y)} m_{\sigma,\lambda}.$$

The quantities of interest are ratios of integrals of the form above, so the $a$ constant in the exponent is arbitrary, and it is set later to avoid numerical problems. We describe our integration scheme for a general $f$. In our implementation, we substitute the appropriate $f$ in place.

We note that singularities in the integrand can create trouble. The singularities occur at the extremes, $\alpha=0, \alpha=\infty$, $\beta=0, \beta=\infty$, causing one or more of the factors to become infinite while another vanishes. For the problems we consider, this results in the integrand vanishing. While appropriate branches can check for the extreme value cases, overflows and underflows in computed intermediate quantities are an issue even for non-extreme values. We reformulate our integrals in a log-based form, allowing product terms to combine as sums:

$$\int_0^\infty \int_0^\infty f(\alpha, \beta) \exp\left(-(e_\alpha + 1)\log\alpha - \frac{b}{2\alpha} - (e_\beta + 1)\log\beta - \frac{c}{2\beta}\right) \times$$

-continued $$\exp\left(-\frac{1}{2}\sum_{i=1}^k \log\left(s_i^2 + \frac{\alpha}{\beta}\right) + \frac{1}{2\alpha}\sum_{i=1}^k \frac{v_i^2}{s_i^2 + \frac{\alpha}{\beta}}\right) d\alpha \, d\beta.$$

In the integrals above, the separation of factors into separate exponentials is only a typesetting consideration. In our implementation, we have used a single exponentiation.

We compactify the region of integration with the following substitutions:

$$\alpha = \alpha_p \frac{1+\chi}{1-\chi}, \, d\alpha = \frac{2\alpha_p}{(1-\chi)^2} d\chi$$

$$\beta = \beta_p \frac{1+\eta}{1-\eta}, \, d\beta = \frac{2\beta_p}{(1-\eta)^2} d\eta$$

with $\chi, \eta \in [-1, 1]$. This is a typical practice for computing improper integrals that is discussed, for example, in Burden and Faires. *Numerical Analysis*. Brooks/Cole, seventh edition, 2004, which is incorporated herein by reference. Thus substituted, the integrals become $$\int_{-1}^1 \int_{-1}^1 f\left(\alpha_p \frac{1+\chi}{1-\chi}, \beta_p \frac{1+\eta}{1-\eta}\right) \exp(a) \times \exp\left(-e_\alpha \log \alpha_p - \right.$$

$$(e_\alpha + 1)\log(1+\chi) + (e_\alpha - 1)\log(1-\chi) - \frac{b(1-\chi)}{2\alpha_p(1+\chi)}\right) \times$$

$$\exp\left(-e_\beta \log \beta_p - (e_\beta + 1)\log(1+\eta) + (e_\beta - 1)\log(1-\eta) - \right.$$

$$\left.\frac{c(1-\eta)}{2\beta_p(1+\eta)}\right) \times \exp\left(-\frac{1}{2}\sum_{i=1}^k \log\left(s_i^2 + \frac{\alpha_p(1+\chi)(1-\eta)}{\beta_p(1+\eta)(1-\chi)}\right) + \right.$$

$$\left.\frac{1-\chi}{2\alpha_p(1+\chi)} \sum_{i=1}^k \frac{v_i^2}{s_i^2 + \frac{\alpha_p(1+\chi)(1-\eta)}{\beta_p(1+\eta)(1-\chi)}}\right) d\chi \, d\eta.$$

This form of the integrals is computed by the low-dimensional numerical integration library libcubature, as described by Johnson and Brown. libcubature, 2005, available at http://wwar.phy.duke.edu/~rgb/libcubature—0.1.0.tgz., which is incorporated herein by reference, which is based on the Genz-Malik embedded cubature rule described in Gene and Malik. An adaptive algorithm for numerical integration over an n-dimensional rectangular region. *J. of Comp. and Appl. Math.*, 6:295-302, 1980, which is also incorporated herein by reference. (It is noted that a simpler tool such as Matlab's dblquad function is not sufficient for this task, and will lead to integrals which either do not converge or are orders of magnitude slower.) This computation is an adaptive routine which computes a trial integral from the sum of points in the center and corners of the integration region, and then refines this estimate according a local error estimate based on additional function evaluations. One pathology of such schemes is that if the first N (for some N) sampled values of the integrand are exactly 0, the algorithm has no sensible choice but to conclude that the integrand is the 0 function and return 0. This is a substantial problem for our $p(y)$ integral, since concentration of probability mass is something to be expected in certain regimes. We take advantage of the fact that in libcubature, the first point probed is always the center of the integration region ($\chi = \eta = 0$).

There are three arbitrary parameters in our formulation, the substitution parameters $\alpha_p, \beta_p > 0$ (the integrals are independent of their values) and $a$ (its contribution vanishes when ratios are taken). We fix these values by taking $(\alpha_p, \beta_p)$ to be the minimizer of $$-e_\alpha \log\alpha - \frac{b}{2\alpha} - e_\beta \log\beta - \frac{c}{2\beta} - \frac{1}{2}\sum_{i=1}^{k} \log\left(s_i^2 + \frac{\alpha}{\beta}\right) + \frac{1}{2\alpha}\sum_{i=1}^{k} \frac{v_i^2}{s_i^2 + \frac{\alpha}{\beta}} \quad (1)$$

which ensures that the value of the non-$f$ part of the integrand is as large as possible at $\chi=\eta=0$. We set a to be the minimum value of (1), which has the effect of avoiding numerical over/underflows by providing a natural scale in the exponent.

We can compute $p(y)$, $E(y_*|y)$, or $p(l<y_*<h)$ with a single integral. We can compute functions of the cumulative distribution function (CDF), such as the median or a confidence interval by computing multiple integrals and using a secant search.

7. Comparison to Related Work

The Bayesian linear regression (BLR) model disclosed herein is linked to the non-Bayesian regularized least squares (RLS) algorithm, where w is found via minimization:

$$\min_{w \in \mathbb{R}^d} \sum_{i=1}^{n}(y_i - x_i w)^2 + \frac{1}{2}\lambda_{RLS}\|w\|^2.$$

It is well-known that w can be found by solving a k dimensional system of equations; thus the mathematics are omitted here. After taking an singular value decomposition of X (in O(ndk) time), we can find the w for an arbitrary value of $\lambda_{RLS}$ in only O(kd) time. Furthermore, we can also compute the vector of leave-one-out errors in O($n^2$d) time, via the formula:

$$LOOE = \frac{(XX^t + \lambda_{RLS}I)y}{diag(XX^t + \lambda_{RLS}I)}.$$

In other words, if n<d, we can optimize the leave-one-out error over the regularization parameter $\lambda_{RLS}$ essentially the same amount of time it takes to construct a w for a single value of $\lambda_{RLS}$. In the Bayesian model presented herein, performing the singular value decomposition up front means that we can evaluate the Bayesian Linear Regression integrand for a single value of the parameters $\sigma^2$ and $\lambda^2$ in O(k) time. As described in the next section, the regularized least-squares regularization parameter $\lambda_{RLS}$ plays essentially the same role as the ratio $\sigma^2/\lambda^2$ in our Bayesian linear regression model disclosed herein.

In Gelman, Carlin, Stern, and Rubin. *Bayesian Data Analysis*. Chapman & Hall/CRC, second edition, 2004, (Sections 14.1-14.5), Gelman et al. consider an alternate fully Bayesian model of linear regression. In the terminology of this description, they remove the scale parameter $\lambda$ which controls the norm of w, and choose a noninformative scale prior over noise levels:

$$p(w, \sigma^2) \propto \sigma^{-2}.$$

This model has the advantage that it is fully analytically tractable. The posterior prediction for a new point $p(y_*|y)$ is a multivariate t distribution with center $X(X^tX)^{-1}X^ty$ and n−d degrees of freedom. The model works best when n>d, and the posterior becomes improper when d<n, so this model is not suited to machine learning situations with many variables relative to the number of examples. The mean prediction under this model is the same as the prediction made by ordinary (unregularized) least squares (OLS).

All the algorithms discussed here require $O(\bar{k}k^2)$ time upfront to manipulate the training data. For OLS or RLS, we can regress a new point in O(d) time. For the Bayesian linear regression model disclosed herein, we need to perform O(dk) work upfront (to form $x_* G_{o,\lambda}^{-1} X^t y$), then perform a two-dimensional integral where the integrand takes O(k) time to evaluate.

8. Experiments

We compare OLS (which is equivalent to the Gelman model when n>d), RLS, and the Bayesian linear regression model described herein (BLR) on a regression task, the pumadyn-8 nm dataset, provided by Zoubin Ghahramani, at http://www.cs.toronto.edu/~delve/data/pumadyn/desc.html. The pumadyn-8 nm dataset is one of eight datasets in the pumadyn family. All of the datasets are variations on a realistic simulation of the dynamics of a Puma 560 robot arm. The task in analyzing these datasets is to predict the angular acceleration of one of the robot arm's links based on the inputs including angular positions, velocities and torques of the robot arm. The pumadyn-8 nm dataset includes 8 inputs, it is non-linear, and it has medium unpredictability/noise. The data consists of 8192 examples in 8 dimensions. Because the task (predicting the angular acceleration of a robot arm link) is known to be nonlinear, we "lift" the 8 dimensional data by taking second and third degree polynomial features, resulting in a 164 dimensional input space. We constructed 50 random permutations of the dataset. For each permutation, we took a test set of 1024 points, and nested training sets of 8, 16, 32, 64, 128, 256, 512, and 1024 points.

Figure 3:
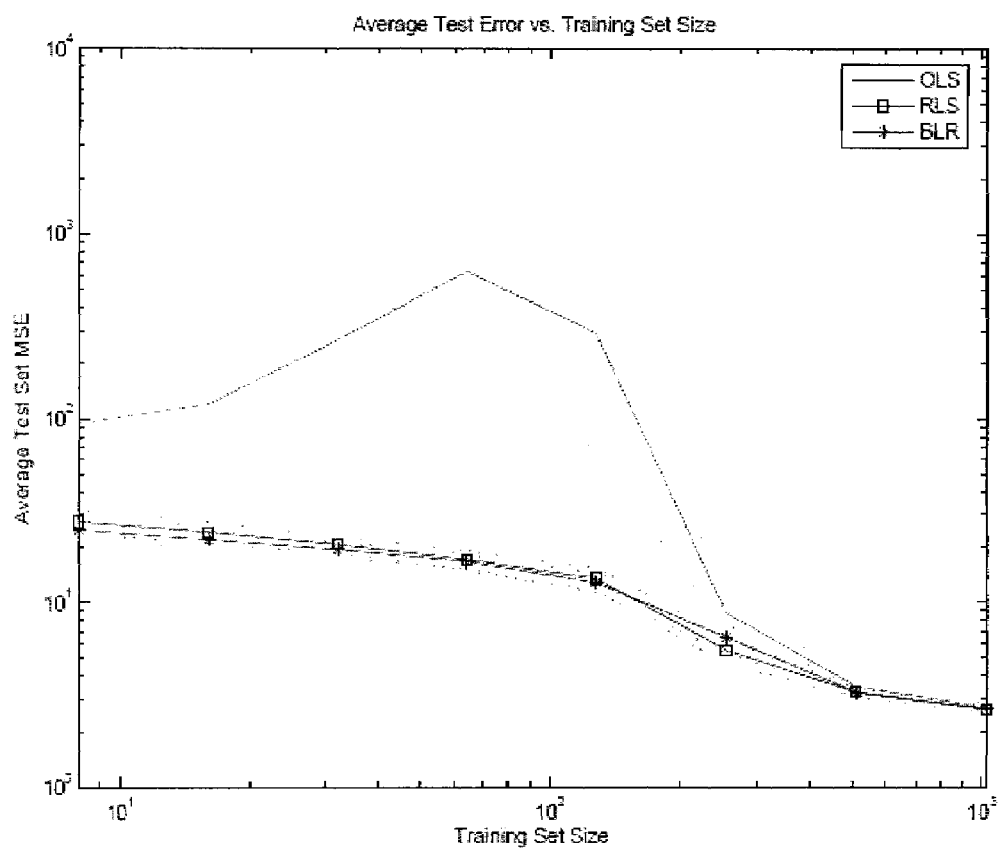
FIG. 3 shows the average mean-square error of ordinary least squares, regularized least squares, and the Bayesian linear regression model in accordance with one embodiment, averaged over 50 replications, and a one standard deviation interval on each side of the average.

FIG. 3 shows the average mean-square error of OLS, RLS, and BLR methods, averaged over the 50 replications, and a one standard deviation interval on each side of the average. For large training set sizes, the methods perform equivalently. The OLS method performs very poorly for small training set sizes, overfitting badly, which leads to a high average mean-square error. RLS and BLR are comparable over the entire range. There is some evidence that BLR is slightly more accurate with very few data points. This is plausible, because BLR is averaging over all hypotheses according to their likelihood, rather than being forced to commit to a single regularization constant.

Figure 4A:
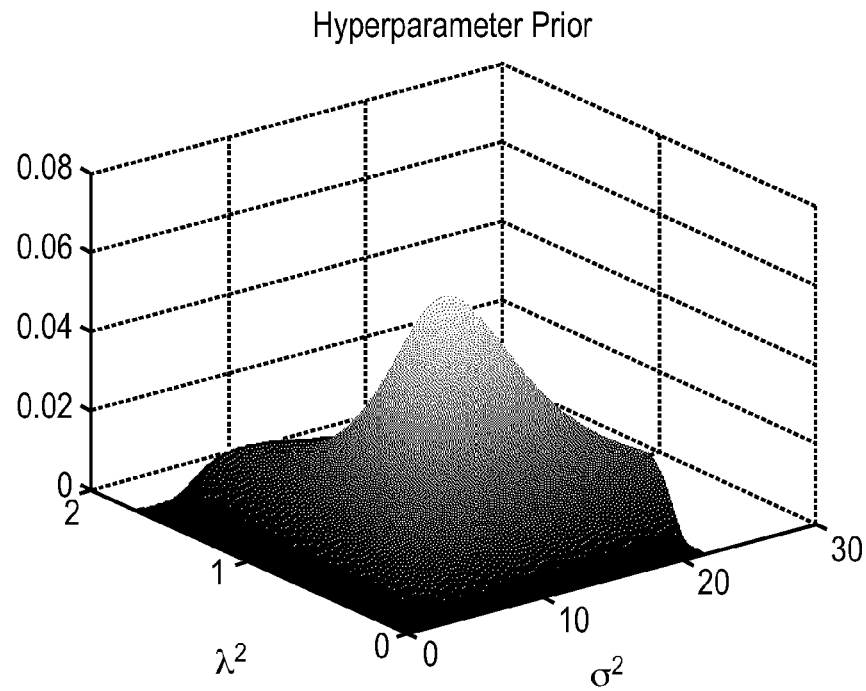
FIG. 4A shows the prior distribution for noise parameter $\sigma^2$ and scale parameter $\lambda^2$, in accordance with one embodiment.
Figure 4B:
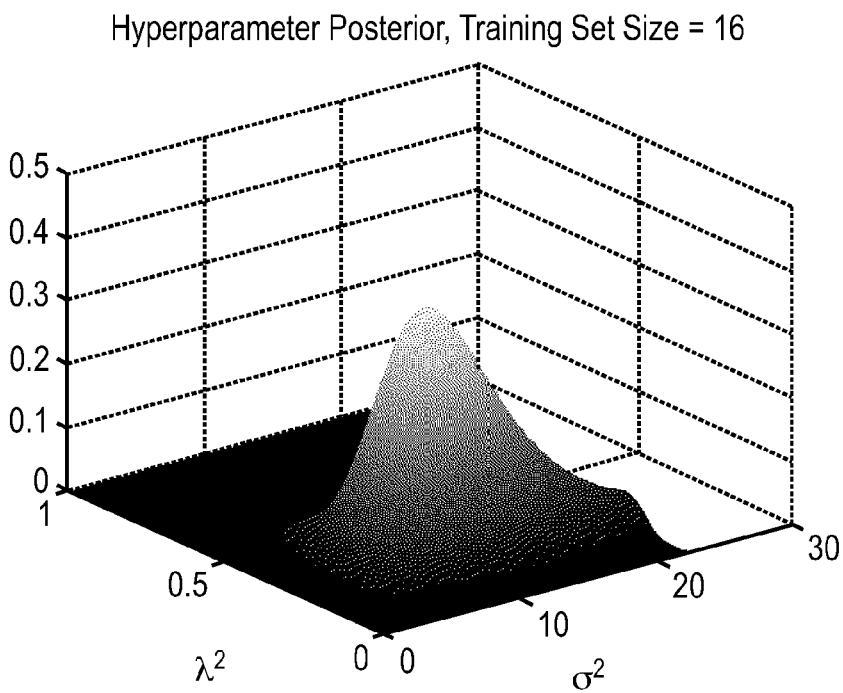
FIG. 4B shows the posterior distribution after training with 16 points, in accordance with one embodiment.
Figure 4C:
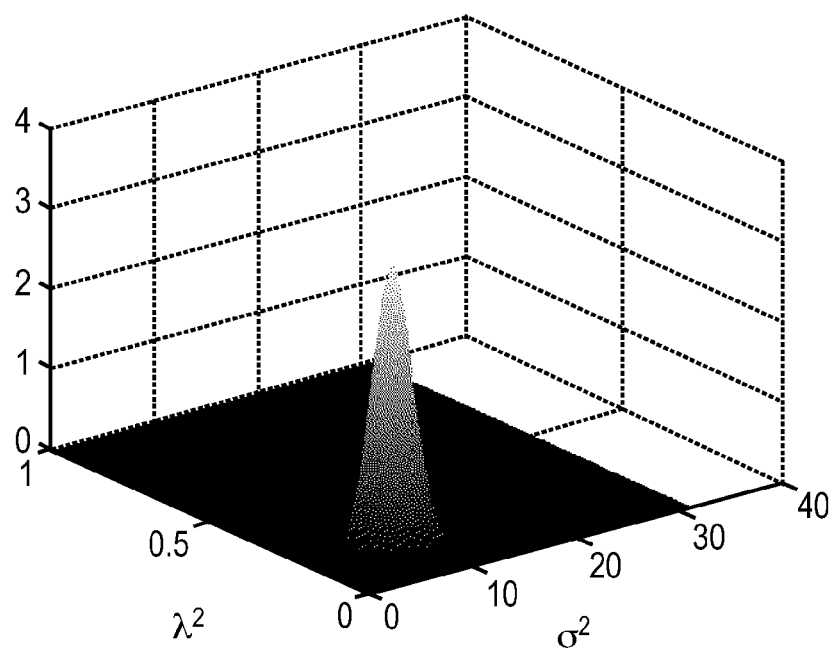
FIG. 4C shows the posterior distribution after training with 128 points, in accordance with one embodiment.
Figure 4D:
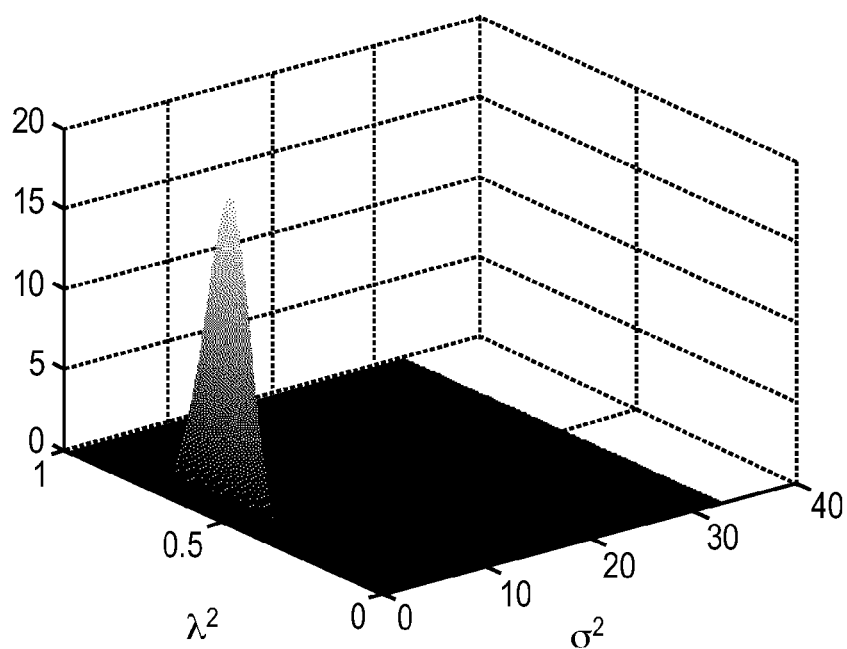
FIG. 4D shows the posterior distribution after training with 1024 points, in accordance with one embodiment.
Figure 5A:
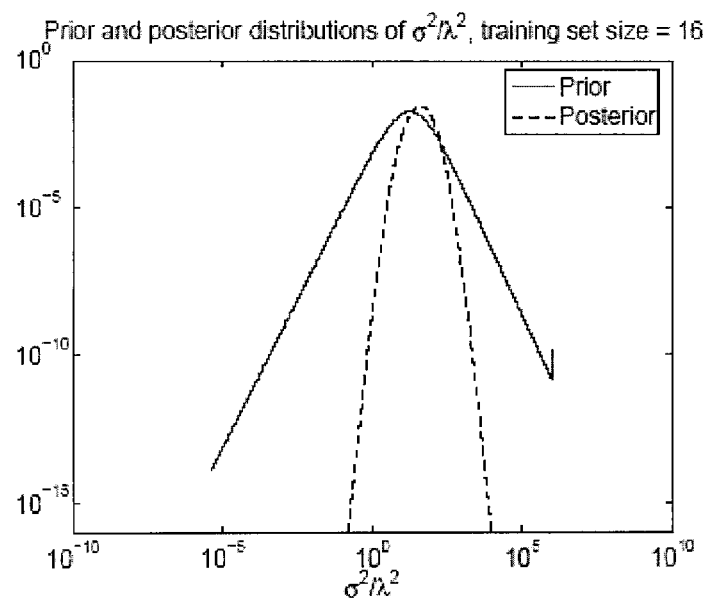
FIG. 5A is a graph of the prior and posterior distributions of the ratio of noise and scale parameters $\sigma^2/\lambda^2$ for a training set size of 16, in accordance with one embodiment.
Figure 5B:
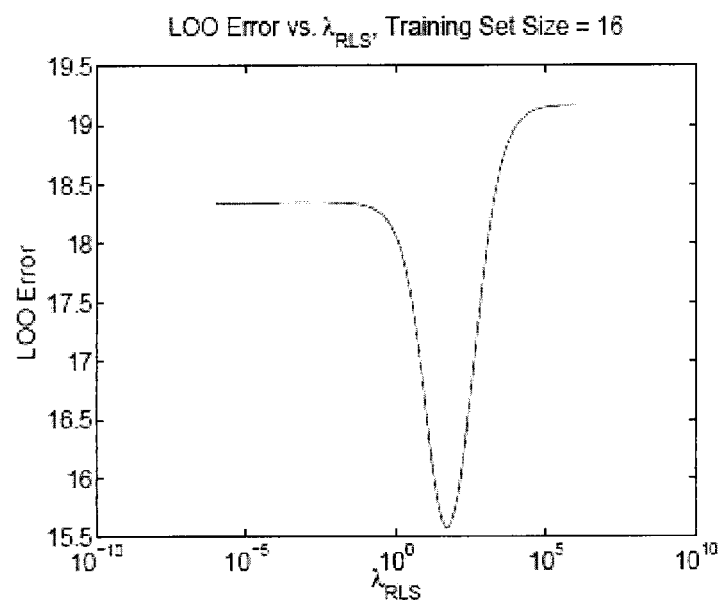
FIG. 5B is a graph of the leave-one-out errors resulting from the use of various $\lambda_{RLS}$ with a training set size of 16, in accordance with one embodiment.
Figure 5C:
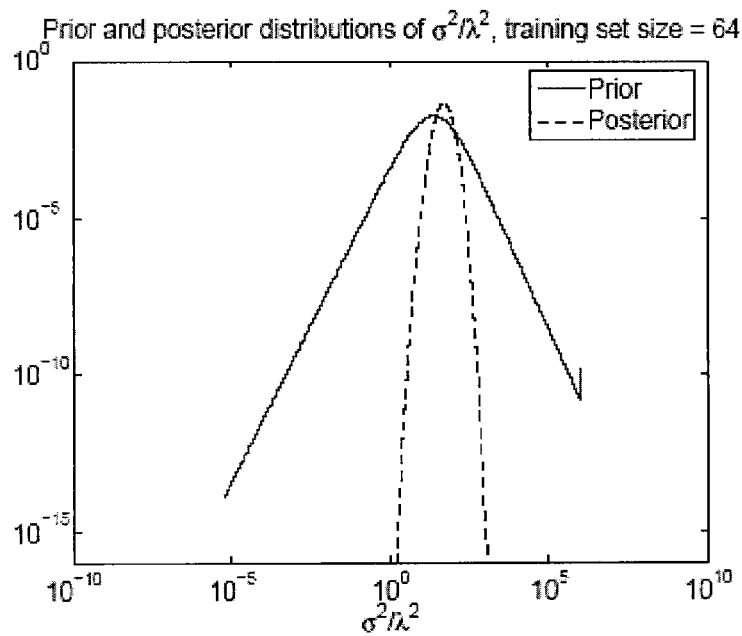
FIG. 5C is a graph of the prior and posterior distributions of the ratio of noise and scale parameters $\sigma^2/\lambda^2$ for a training set size of 64, in accordance with one embodiment.
Figure 5D:
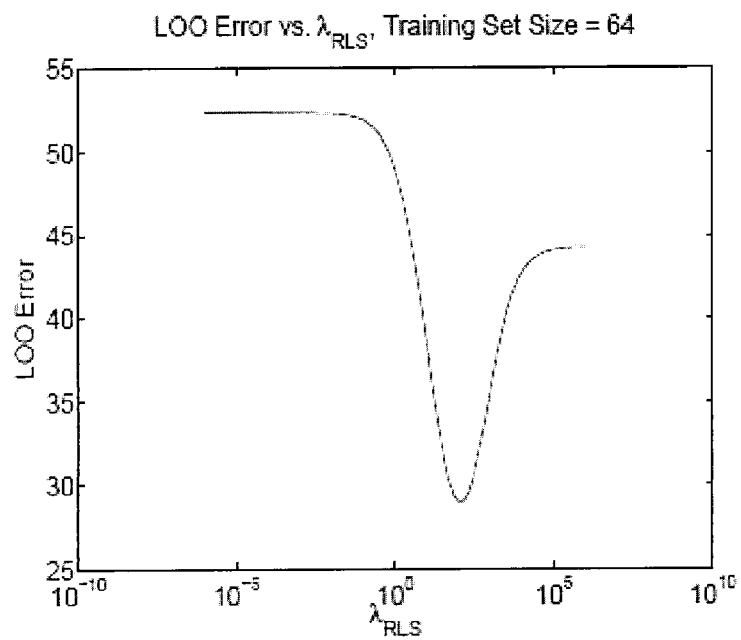
FIG. 5D is a graph of the leave-one-out errors resulting from the use of various $\lambda_{RLS}$ with a training set size of 64, in accordance with one embodiment.
Figure 5E:
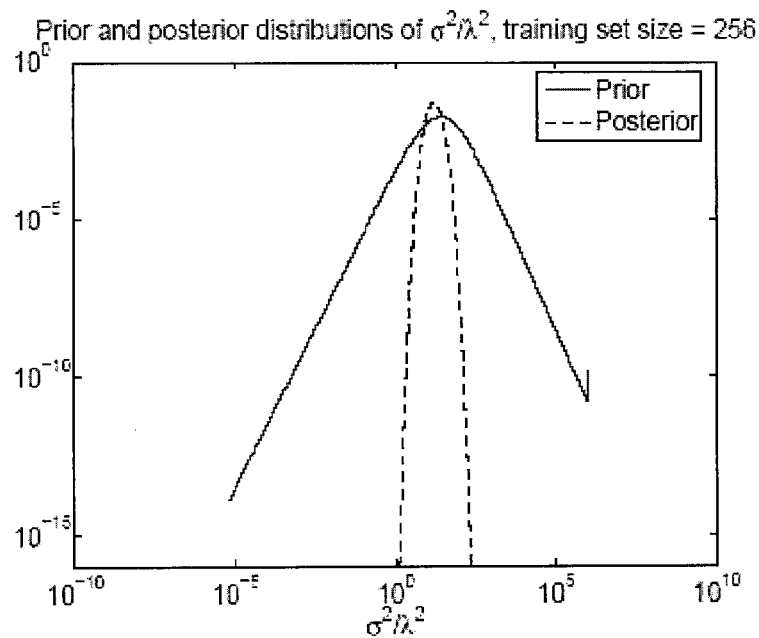
FIG. 5E is a graph of the prior and posterior distributions of the ratio of noise and scale parameters $\sigma^2/\lambda^2$ for a training set size of 256, in accordance with one embodiment.
Figure 5F:
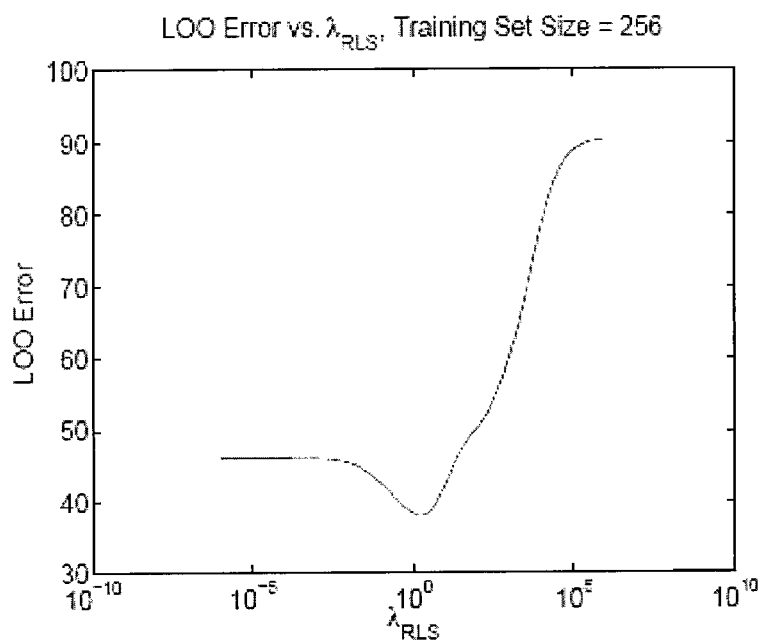
FIG. 5F is a graph of the leave-one-out errors resulting from the use of various $\lambda_{RLS}$ with a training set size of 256, in accordance with one embodiment.
Figure 5G:
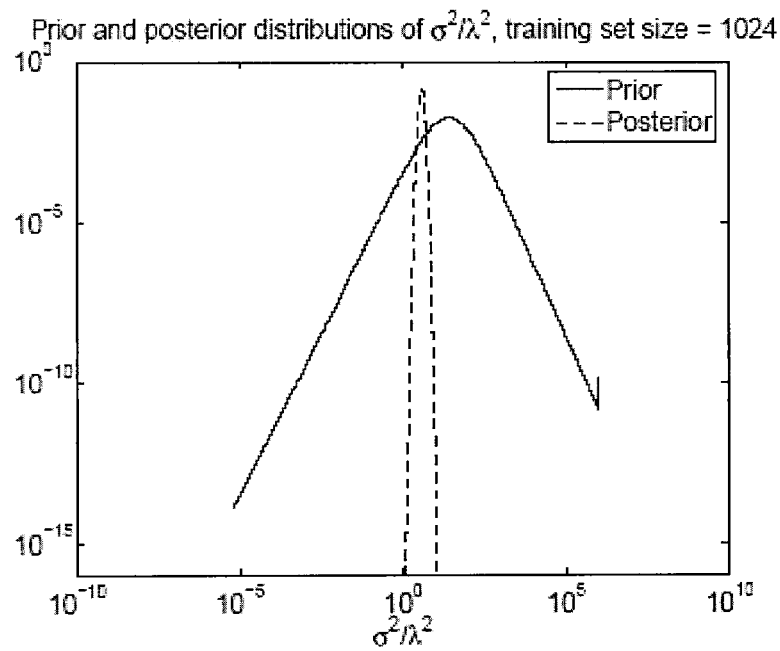
FIG. 5G is a graph of the prior and posterior distributions of the ratio of noise and scale parameters $\sigma^2/\lambda^2$ for a training set size of 1024, in accordance with one embodiment.
Figure 5H:
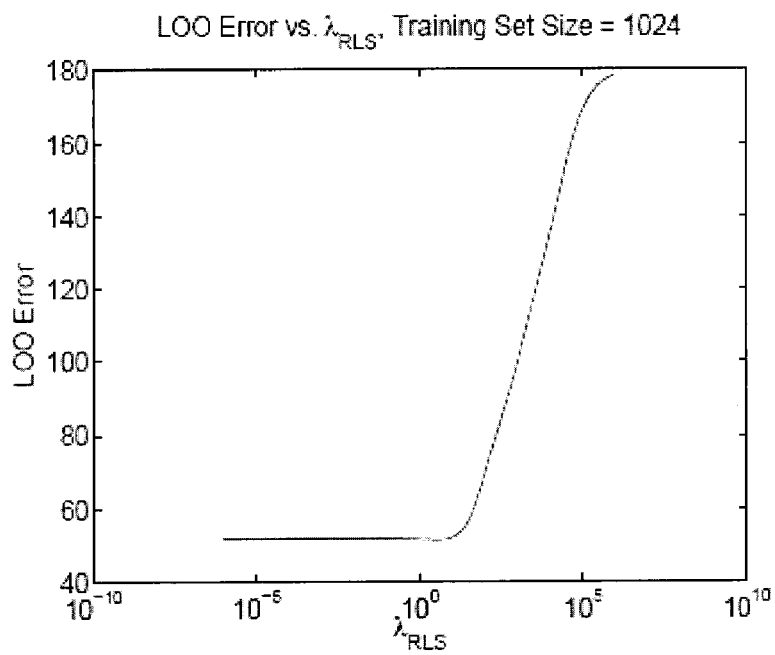
FIG. 5H is a graph of the leave-one-out errors resulting from the use of various $\lambda_{RLS}$ with a training set size of 1024, in accordance with one embodiment.

FIG. 4A shows the prior distribution for $\sigma^2$ and $\lambda^2$, in accordance with one embodiment. FIGS. 4B-D shows the posterior distributions after training with 16, 128, and 1024 points (for a single realization), respectively. As the training sets increase in size, the posterior becomes progressively more sharply peaked.

As discussed above in Section 7, there is a close relationship between $\lambda_{RLS}$, the regularization parameter for regularized least squares, and the ratio $\sigma^2/\lambda^2$ in BLR. In FIGS. 5A-H, it is shown that for small training set sizes, BLR tends to focus attention on ratios of $\sigma^2/\lambda^2$ that would have small LOO errors were they are used as $\lambda_{RLS}$. For large training set sizes, all regularizers up to some critical value have close to optimal LOO errors, and BLR tends to concentrate around this critical point. Both algorithms automatically choose smaller amounts of regularization as the training set size increases. At test time, the algorithm is orders of magnitude slower than OLS or RLS, but fast enough to be usable, especially with small training sets. In our experiment, when n=8, testing cost 0.0012 seconds per data point. The testing costs are roughly linear in n for n<d, and essentially constant for n>d.

Thus, it is shown that the fully Bayesian model for linear regression is well suited to scenarios with many dimensions and few examples. We have shown empirically how the data causes a vague hyperparameter prior to become peaked around desirable values. Our method relies on a combination of techniques: numerical integration to explicitly integrate over the hyperparameters and the SVD to make evaluating the integrand fast. Our method is orders of magnitude slower at evaluating new test points than methods that estimate the posterior as a delta function. However, it is fast enough to use, especially if only a few data points are available, and we retain the key advantages of a fully Bayesian treatment: we can obtain confidence intervals in a principled way, and easily minimize the expected regret under an arbitrary loss function.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining" or "computing" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of performing linear regression to predict data points, the method comprising:
   receiving a training set of data, wherein the training set of data comprises one selected from the group consisting of audio data, image data, and data describing motion of an object;
   building a Bayesian linear regression model based on the training set of data, wherein the Bayesian linear regression model specifies that a hyperplane w is conditioned on a scale parameter $\lambda$ and that there is Gaussian noise in the output data represented by a noise parameter $\sigma$, and wherein the ratio of $\sigma$ and $\lambda$ is a regularization parameter for w;
   applying the Bayesian linear regression model to predict data points associated with the training set of data; and
   outputting the predicted data points.

2. The computer-implemented method of claim 1, further comprising:
   determining the scale parameter $\lambda$ and the noise parameter $\sigma$ based on independently scaled inverse priors associated with the scale parameter $\lambda$ and the noise parameter $\sigma$.

3. The computer-implemented method of claim 1, further comprising:
   computing confidence intervals on predicted data points; and
   outputting the confidence intervals on the predicted data points.

4. The computer-implemented method of claim 1, wherein the training set of data comprises n training points in d dimensions, and d is greater than n.

5. The computer-implemented method of claim 1, wherein the training set of data comprises n training points in d dimensions, and n is greater than d.

6. The computer-implemented method of claim 2, wherein the scale parameter $\lambda$ and the noise parameter $\sigma$ are determined through singular value decomposition and adaptive numerical integration.

7. A computer program product for performing linear regression to predict data points, the computer program product stored on a computer readable medium and adapted to perform the operations of:
receiving a training set of data, wherein the training set of data comprises one selected from the group consisting of audio data, image data, and data describing motion of an object;
building a Bayesian linear regression model based on the training set of data, wherein the Bayesian linear regression model specifies that a hyperplane w is conditioned on a scale parameter $\lambda$ and that there is Gaussian noise in the output data represented by a noise parameter $\sigma$, and wherein the ratio of $\sigma$ and $\lambda$ is a regularization parameter for w;
applying the Bayesian linear regression model to predict data points associated with the training set of data; and
outputting the predicted data points.

8. The computer program product of claim 7, wherein the computer program product is further adapted to perform the operations of:
determining the scale parameter $\lambda$ and the noise parameter $\sigma$ based on independently scaled inverse priors associated with the scale parameter $\lambda$ and the noise parameter $\sigma$.

9. The computer program product of claim 7, wherein the computer program product is further adapted to perform the operations of:
computing confidence intervals on predicted data points; and
outputting the confidence intervals on the predicted data points.

10. The computer program product of claim 7, wherein the training set of data comprises n training points in d dimensions, and d is greater than n.

11. The computer program product of claim 7, wherein the training set of data comprises n training points in d dimensions, and n is greater than d.

12. The computer program product of claim 8, wherein:
the scale parameter $\lambda$ and the noise parameter $\sigma$ are determined through singular value decomposition and adaptive numerical integration.

* * * * *